(12) United States Patent
Creighton

(10) Patent No.: US 11,375,155 B2
(45) Date of Patent: Jun. 28, 2022

(54) INTERCOM SYSTEM AND STATION

(71) Applicant: ADVANCED ELECTRONIC SOLUTIONS GLOBAL LTD a Northern Irish company of Unit 4C, County Tyrone (GB)

(72) Inventor: Paul Creighton, County Tyrone (GB)

(73) Assignee: ADVANCED ELECTRONIC SOLUTIONS GLOBAL LTD, County Tyrone (IE), (A NORTHERN IRISH COMPANY OF UNIT 4C)

( * ) Notice: Subject to any disclaimer, the term of this patent is extended or adjusted under 35 U.S.C. 154(b) by 0 days.

(21) Appl. No.: 17/249,601

(22) Filed: Mar. 5, 2021

(65) Prior Publication Data
US 2021/0281799 A1 Sep. 9, 2021

(30) Foreign Application Priority Data
Mar. 5, 2020 (EP) .................................... 20161147

(51) Int. Cl.
*H04N 7/14* (2006.01)
*H04N 7/18* (2006.01)

(52) U.S. Cl.
CPC ............ *H04N 7/142* (2013.01); *H04N 7/147* (2013.01); *H04N 7/181* (2013.01); *H04N 7/186* (2013.01); *H04N 2007/145* (2013.01)

(58) Field of Classification Search
CPC ...... H04N 7/14; H04N 7/186; H04N 5/23206; H04N 5/2256; H04M 1/0291; H04M 11/025
USPC ........................................... 348/14.01–14.16
See application file for complete search history.

(56) References Cited

U.S. PATENT DOCUMENTS

| | | | |
|---|---|---|---|
| 2007/0004446 A1 | 1/2007 | Moran et al. | |
| 2013/0148582 A1* | 6/2013 | Braun | H04W 4/16 370/328 |
| 2018/0191930 A1* | 7/2018 | Jeong | H04N 5/2252 |
| 2019/0246077 A1* | 8/2019 | Siminoff | H04N 7/186 |
| 2019/0355193 A1* | 11/2019 | Kirsch | G07C 9/37 |
| 2020/0228758 A1* | 7/2020 | Wang | G08B 3/10 |

FOREIGN PATENT DOCUMENTS

| | | | |
|---|---|---|---|
| GB | 2439105 A | * 12/2007 | ............... G08B 3/10 |
| GB | 2439105 A | 12/2007 | |
| WO | 2006067782 A1 | 6/2006 | |

(Continued)

OTHER PUBLICATIONS

EP 20161147 European Search Report dated Sep. 4, 2020, 8 pages.

*Primary Examiner* — Melur Ramakrishnaiah
(74) *Attorney, Agent, or Firm* — Boisbrun Hofman, PLLC

(57) ABSTRACT

A second intercom station when activated activates camera means to take a picture of a user and sends the picture to a first intercom station in an MMS and automatically and substantially simultaneously attempts to connect via a voice call to the first intercom station. The first intercom station displays the picture and substantially simultaneously receives the voice call connection attempt from the second intercom station when the MMS is received. The first intercom station comprises means to reject or accept the voice call. If the voice call is accepted then two-way voice communication between the first and second station is enabled, and if the voice call is rejected then two-way voice communication between the first and second station is not enabled.

13 Claims, 2 Drawing Sheets

(56) References Cited

FOREIGN PATENT DOCUMENTS

WO 2014123811 A2 8/2014
WO 2014123811 A3 8/2014

\* cited by examiner

INTERCOM SYSTEM AND STATION

This application claims priority to and the benefit of European Patent Application No. 20161147.2, titled "An Intercom System and Station," filed Mar. 5, 2020, the entire disclosure of which is hereby incorporated herein by reference.

The present invention relates to an intercom system and station of the type used in access control and security.

BACKGROUND TO THE INVENTION

Safety conscious home and business owners typically elect to install entrance door or gate intercom devices that provide means for video and audio communications with visitors. Such devices enable visible and audio authentication of visitors before access to a home or premises is permitted or refused by the occupant.

Intercom systems are generally configured for two-way communication between connected stations, in which a station provided at an entrance doorway or gate to a home or premises is communicatively coupled with another station provided within the home or premises. Visitors to the home or premises interact with the station at the doorway or gate and the occupant operates the intercom station within the home or premises to verify the identity of the visitor and decide whether to grant access to the home or premises.

Some intercom systems rely solely on two-way voice communication for verification and others use video streamed from a camera provided at the door or gate station so that an occupant may view the streamed video images on a display to verify the identity of a visitor and take the desired action regarding access.

Use of mobile devices executing suitable application software may also be adapted so that home or business owners may view visitor activity on the display of their own device, even when not physically in their home or premises. However, these known intercom systems and devices suffer from the drawback they are not time sensitive in terms of the delivery of communications, particularly where a camera is being used to steam live video footage to station within the home or premises.

Moreover, they typically rely on costly dedicated application software, cloud peer to peer servers (which incur monthly fees) plus the maintenance of smart phone apps, the latter of which also cause some less technically apt users, challenges rendering the solution provided expensive to buy and install as well as complex to maintain and run.

GB2439105A discloses a doorbell providing different alert signals for different occupants of a premise. The said doorbell comprises a display to identify occupants of a premise to a visitor and also provides different alert signals to the occupants according to which occupant is selected by the visitor via the display. An internal unit comprises an electronic memory (non-volatile memory) for storing a plurality of distinctive alert signals that are mapped to an occupant's identity. The doorbell is also said to include a microphone enabling the visitor to leave an audio message for an occupant and a communication device for providing further alert signal to a mobile communication device of the occupant selected via the display. The doorbell further comprises a digital camera to send one or more images of the visitor to the mobile communication device, via Bluetooth connection, and/or to capture and store an image of the visitor in memory.

However, a skilled person would readily appreciate that the entire arrangement for two-way communication according to GB2439105A will easily take more than 15 seconds to process and send the image and call of the visitor to the occupant's communication device as the image is first required to be saved in the non-volatile memory and then transmitted via Bluetooth connection. By the time this entire process would occur, there are chances that the visitor might have left the premises presuming no answer from the occupant.

The present invention aims to alleviate the time lag in the two-way communication process and significantly improve the time sensitivity by reducing the time for the entire two-way communication to under 10 seconds.

It is an object of the present invention to provide an intercom system and station that goes at least some way toward overcoming the above problem and that will provide the public and/or industry with a useful alternative.

SUMMARY OF THE INVENTION

Aspects of the present invention will become apparent from the ensuing description which is given by way of example only.

The present invention relates to an intercom system for two-way communication between intercom stations so that home and/or business owners may view visitor activity, even when not physically in their home or premises.

According to the invention, there is provided an intercom system for two-way communication between intercom stations, the intercom system comprising:
  a first intercom station comprising one or more processor means and having means for receiving and viewing a multimedia message (MMS) and means for two-way voice communication,
  a second intercom station comprising one or more processor means, camera means and means for two-way voice communication with the first intercom station,
  wherein, when activated, the second intercom station is operable to activate the camera means to take a picture of the user and to send the picture taken to the first intercom station in an MMS and automatically and substantially simultaneously attempt to connect via a voice call to the first intercom station, and wherein the first intercom station is operable to display the picture and substantially simultaneously receive the voice call connection attempt from the second intercom station when the MMS is received, and
  wherein the first intercom station comprises means to reject or accept the voice call, wherein if the voice call is accepted then two-way voice communication between the first and second station is enabled, and if the voice call is rejected then two-way voice communication between the first and second station is not enabled.

Preferably, the intercom system comprises a plurality of first intercom stations and a plurality of second intercom stations.

Preferably, the voice call is an analogue voice telephone call.

Alternatively, the voice call is a Voice over LTE (VoLTE) call.

Preferably, the second intercom station is provided as a control panel device. The second intercom station, e.g. control panel device, is preferably wall or gate mounted.

In a preferred embodiment, the second intercom station comprises a call button that when pressed activates the camera means.

Preferably, first intercom station is selected from among a mobile phone, tablet, laptop or the like.

The term "mobile phone" is intended to include smart phones.

Preferably, the second intercom station further comprises storage means, including a static random-access memory (SRAM) and a synchronous dynamic random-access memory (SDRAM), wherein the picture taken by the camera means is first saved to the SRAM and then to the SDRAM. The pictures taken by the camera means are thus locally stored at the second intercom station.

Preferably, lighting means is provided adjacent or beside the camera means of the second intercom station, wherein activating the camera means simultaneously activates the lighting means. The lighting means is preferably provided by one or more LEDs. However, this is not to be considered limiting and other lighting means are contemplated within the scope of the invention.

In another aspect of the present invention there is provided an intercom station comprising:
- one or more processor means, camera means and means for two-way voice communication,
- wherein, when activated, the intercom station is operable to activate the camera means to take a picture of the user and to send the picture to a remote processor device in an MMS and automatically and substantially simultaneously attempt to connect via a voice call to the remote processor device,
- wherein if the voice call is accepted then two-way voice communication between the intercom station and remote processor device is enabled, and if the voice call is rejected then two-way voice communication between the intercom stations is not enabled.

According to the invention, users do not need third party applications executing on their mobile phone, laptop, or tablet, operating as the first intercom station, in order to see the visitor as they would with other products.

The present invention provides a security solution through a user's existing provider contract, e.g. mobile phone contract, by relying on the use of MMS and two-way voice communications. This avoids the need for third party applications and associated server costs.

Preferably, the intercom station is provided as a control panel device. The intercom system, e.g. control panel device, may be wall or gate mounted.

Preferably, the intercom station comprises a call button that when pressed activates the camera means.

Preferably, the intercom station comprises an LCD screen with up and down scroll buttons to locate a desired home or premises.

Preferably, lighting means is provided adjacent or beside the camera means of the second intercom station, wherein activating the camera means simultaneously activates the lighting means. The lighting means is preferably provided by one or more LEDs. However, this is not to be considered limiting and other lighting means are contemplated within the scope of the invention.

Preferably, the intercom station comprises storage means, including a static random-access memory (SRAM) and a synchronous dynamic random-access memory (SDRAM), wherein the picture taken by the camera means is first saved to the SRAM and then to the SDRAM.

The present invention provides an intercom system having an intercom station with a SIM card inside and a cellular modem. When the call button of the second intercom station is pressed the camera means will take a snapshot of the visitor. The intercom will then send the image as an MMS to the home or premises owner operating first intercom station. The visitor will be played a voice message, such as "please wait while your call is being connected".

After that voice message is played, the intercom station will call the first intercom station, being the home or premises owner, in what is a traditional voice call. Such a call may be in two formats depending on connectivity in the area. The first is a standard analogue voice telephone call, and the other is VoLTE (Voice over LTE) which is a HD quality voice connection likely to be the new standard in voice calling in the future.

On the receiving side, the first intercom station receives a picture message (MMS) on their phone or other device on which they can view the visitor, and in a matter of seconds later, or preferably substantially simultaneously, they will receive a call from the second intercom station. The user of the first intercom station may elect to answer the call or not based on the video information from the picture and make a decision regarding access to the home or premises.

Thus, the intercom system for two-way communication as per the present invention implements a technique of double memory buffering (static random-access memory followed by synchronous dynamic random-access memory) such once the photograph is taken, the picture is captured in fast acting RAM memory and instantly transmitted to the modem for sending to the phone. Meanwhile and in parallel, the image is also processed for storage in flash memory, which takes much longer. This has allowed the message to be sent without the delay of saving to non-volatile memory first.

BRIEF DESCRIPTION OF THE DRAWINGS

Certain preferred embodiments of the present invention will now be described, by way of example only, with reference to the accompanying drawings in which.

DETAILED DESCRIPTION

Figure 1:
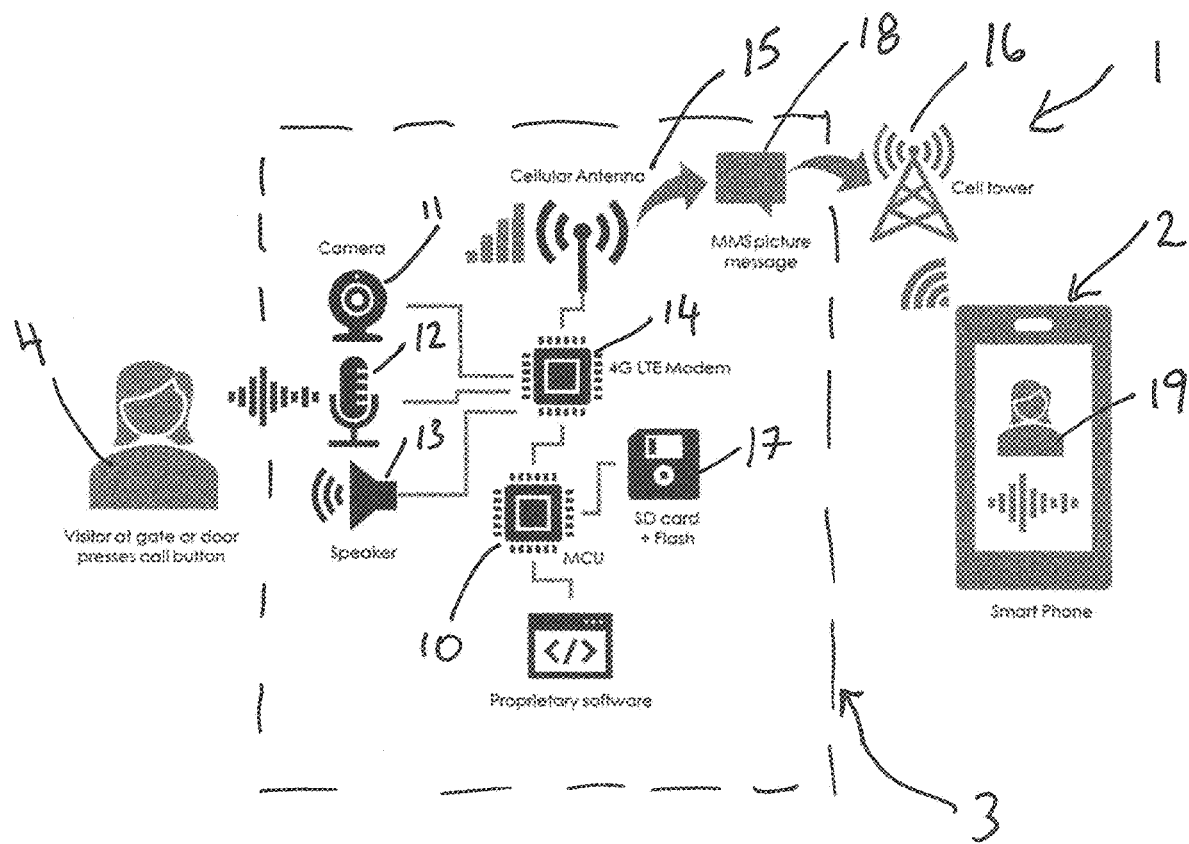
FIG. 1 is a schematic of an intercom system according to the invention.

Various embodiments of the present invention will be described in detail with reference to the drawings, where like reference numeral represent like parts and assemblies throughout the several views.

Referring to the drawings, and initially to FIG. 1, there is shown an intercom system, indicated generally by the reference numeral 1, for two-way communication between intercom stations, which in the instance shown comprises a first intercom station, indicated generally by the reference numeral 2, and a second intercom station, indicated generally by the reference numeral 3.

In the instance shown, first intercom station 2 is a mobile phone, although it will be appreciated that such a station 2 may alternatively be provided as a tablet, laptop, wall mounted device or the like as required. First intercom station 2 is thus operable by a home or business owner to view and communicate with a visitor 4 wishing to gain access to the home or other premises, whereas visitor 4 may communicate with the home or business owner by interacting with second intercom station 3. Second intercom station 3 may be provided as a control panel device that is secured or mounted to a building or gateway.

Although FIG. 1 shows intercom system 1 comprising a first intercom station 2 communicatively coupled via a cellular network to a second intercom station 3, it will be understood that the system 1 may comprise a plurality of such intercom stations 2, 3 as required according to the security and access requirements of a particular site or property. For example, in a block of apartments or office premises it is foreseeable that intercom system 1 may comprise numerous first intercom stations 2, wherein each first intercom station 2 is separately associated with an individual specific apartment or office and therefore each first intercom station 2 is operable by the specific home owner or occupant. Moreover, multiple second intercom stations 3 may also be provided, for example, if a home, block of apartments or business premises has multiple entrances for visitors, wherein separate second intercom stations 3 are provided at each gate or entrance doorway as required. Reference to one first intercom station 2 and/or one second intercom station 3 should therefore in no way be seen as limiting.

First intercom station 2 comprises one or more processor means and means for receiving and viewing an MMS. First intercom station 1 also includes means for two-way voice communication and is configured to receive a voice call from second intercom station 3.

Second intercom station 3 comprises one or more processor means 10 and camera means 11. Second intercom station 3 also comprises means for two-way voice communication with first intercom station 2, and thus includes microphone means 12, speaker means 13, modem 14 and antenna means 15 for connectivity to network 16. Second intercom station 3 further comprises storage means 17, including a static random-access memory (SRAM) and a synchronous dynamic random-access memory (SDRAM), wherein pictures taken by camera means 11 are first saved to the SRAM and then to the SDRAM. The pictures taken by camera means 11 are thus locally stored at memory 17 of second intercom station 4.

Second intercom station 3 further comprises a call button that when pressed activates camera means 11, wherein when second intercom station 3 is activated, camera means 11 takes a picture 19 of visitor 4 and sends picture 19 to first intercom station 2 in an MMS 18 and automatically and substantially simultaneously attempts to connect via a voice call to first intercom station 2. As shown, first intercom station 2 is operable to display picture 19 on its screen display and substantially simultaneously receive the voice call connection attempt from second intercom station 3 when MMS 18 is received at first intercom station 2.

First intercom station 2 comprises means to reject or accept the voice call, wherein if the voice call is accepted then two-way voice communication between first and second station 2, 3 is enabled, and if the voice call is rejected then two-way voice communication is not enabled.

The voice call is a standard analogue voice telephone call or may be implemented as a Voice over LTE (VoLTE) call.

Lighting means (not shown) is provided adjacent or beside camera means 11 of second intercom station 3, wherein activating camera means 11 simultaneously activates the lighting means. The lighting means is preferably provided by one or more LEDs. However, this is not to be considered limiting and other lighting means are contemplated within the scope of the invention.

Figure 2:
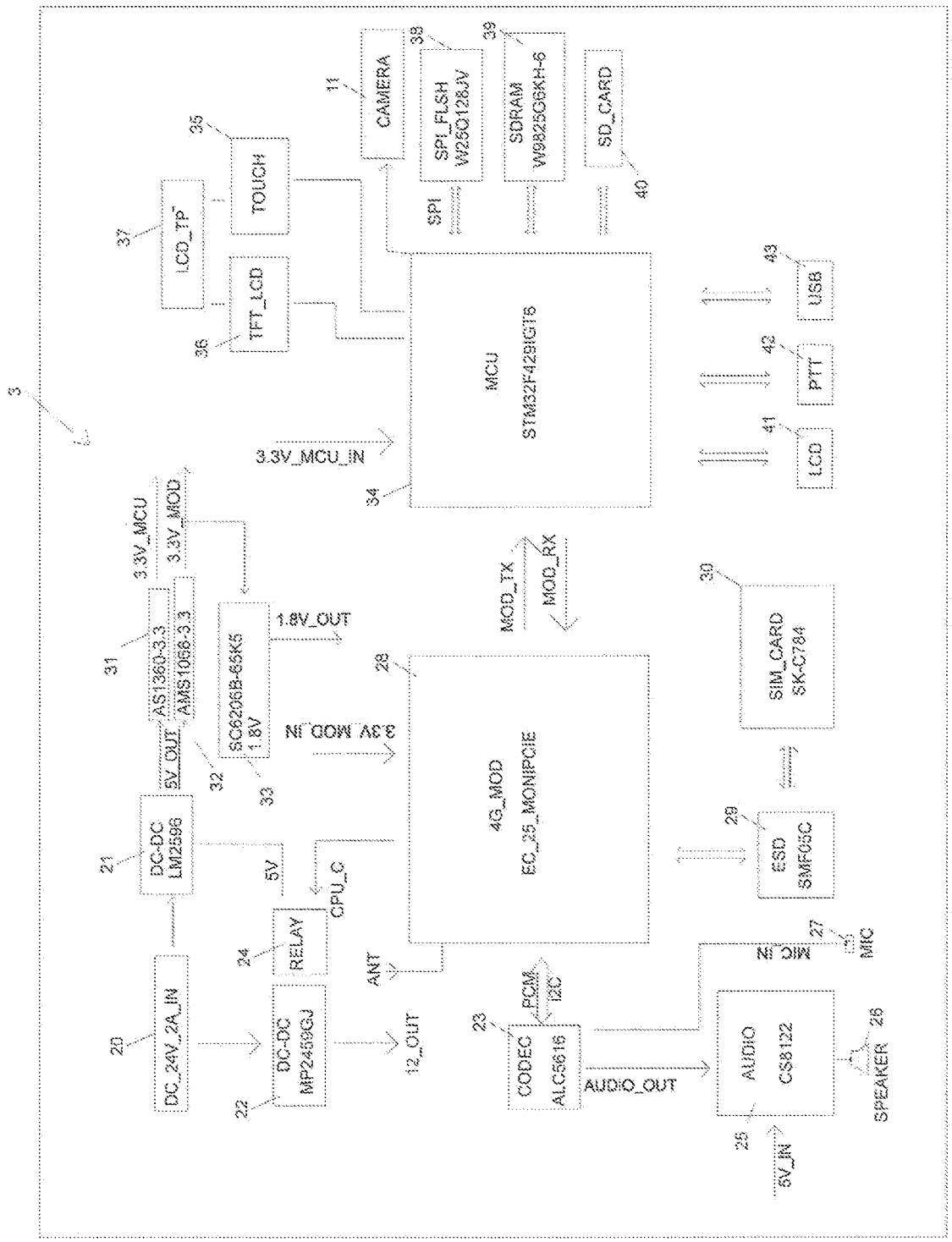
FIG. 2 is a detailed block diagram of an intercom station according to the invention.

FIG. 2 is a detailed block diagram of an intercom station, and specifically second intercom station 3, according to the invention. As shown intercom station 3 comprises an external power supply regulator 20, a 5V Voltage regulator 21, step up switch mode power supply 22 to generate 12v DC, CODEC 23 operable to convert analogue speaker and microphone sound to digital signals and RELAY 24 to trigger devices on request of the CODEC 23, a speaker amplifier 25, speaker 26 and microphone 27.

Also included within second intercom station 3 is 4G modem card 28 which facilitates connection to the cellular networks, a TVS diode 29 to suppress human induced electro-static discharge, and SIM card holder 30 for a Subscriber Information Module (SIM) card. A linear voltage regulator circuit 31 creates a 3.3V output to power the micro-controller unit (MCU) 34, and linear voltage regulator circuit 32 to create 3.3V to power to modem 28 with a 1.8V power circuit 33. This main micro controller 34 processes commands and events including inputs and outputs and the processing of picture 19 taken by camera means 11. An LCD touch screen 35 and driver circuits 36, 37 are provided as a user human interface. Camera means 11 may be provided with a digital IP camera for capturing the image of visitor(s) 4. A flash memory device 38, SDRAM 39 RAM memory, and an SD card 40 for permanent storage of images 19 and visitor events which can be removed and viewed on another device if needed, for example a personal computer (PC), are also provided. Intercom station 3 also includes LCD port 41 for a non-touch screen LCD for display, PTT inputs 42 being push-to-talk button inputs and a USB port 43 for firmware updates and information download to a PC.

4G modem 28 and a motherboard with high speed processing handle the video image quickly so that there are minimal delays in sending picture message 18. Micro SD card 40 is used to store pictures 19 locally on the intercom. These pictures 19 can be retrieved at any stage by the home or business owner. For example, if they missed a call from the intercom or had their phone turned off, they can use a special password protected SMS message to retrieve specific images from SD card 40 on demand.

Intercom station 3 takes an MMS snapshot picture 19 of the visitor when the call button is pressed, sends it to the home owner intercom station 2, and then makes a voice call so that the home owner operating intercom station 2 can speak with visitor 4 and decide to grant access or not via an entrance gate or door.

Intercom station 3 uses an OV2640 internal DSP camera to generate JPEG pictures. A STM32 on the main board obtains the picture data through the DCMI interface and use of DMA double buffering method, which is first saved to the internal SRAM and then to the SDRAM (speed first, then backup later).

The LCD display of second intercom station 3 has a very large illuminated surface area across as much of the face of intercom station 3 to reduce intensity, while increasing the lux levels of light on the scene being viewed. The LED panels are activated when the call button is pressed, and then turned off again when the call is ended.

Addition of an LCD touch screen is facilitated with a current limiting resistor in series with capacitors to slow down their charge and a diode in parallel with the capacitors. The diode is polarised to force charge current through the resistor on power up but allow high demand current draw away from the capacitors to the board in time of peak draw. Micro SD card 40 facilitates storage of the pictures 19 locally on the intercom. These can be retrieved at any stage by the home or business owner, for example if they miss a call from the intercom or have their phone turned off, they can use a special password protected SMS message to retrieve specific images from the SD card on demand.

It is to be understood that the invention is not limited to the specific details described herein which are given by way of example only and that various modifications and alterations are possible without departing from the scope of the invention as defined in the appended claims.

The invention claimed is:

1. An intercom system for two-way communication between intercom stations, the system comprising:
   a first intercom station comprising one or more processor means and having means for receiving and viewing a multimedia message and means for two-way voice communication,
   a second intercom station comprising one or more processor means, camera means and means for two-way voice communication with the first intercom station,
   characterized in that the second intercom station further comprises storage means, including a static random-access memory (SRAM) and a synchronous dynamic random-access memory (SDRAM), wherein, when activated, the second intercom station is operable to activate the camera means to take a picture and to send the picture taken to the first intercom station in a multimedia message and automatically and substantially simultaneously attempt to connect via a voice call to the first intercom station, and
   the first intercom station is operable to display the picture and substantially simultaneously receive the voice call connection attempt form the second intercom station when the multimedia message is received, and
   wherein the first intercom station comprises means to reject or accept the voice call, wherein if the voice call is accepted then two-way voice communication between the first and second station is enabled, and if the voice call is rejected then two-way voice communication between the first and second station is not enabled, and
   wherein the picture taken by the camera means is first saved to the SRAM and then to the SDRAM.

2. The intercom system as claimed in claim 1, further comprising a plurality of first intercom stations and a plurality of second intercom stations.

3. The intercom system as claimed in claim 1, wherein the voice call is a standard analogue voice telephone call.

4. The intercom system as claimed in claim 1, wherein the voice call is a Voice over LTE call.

5. The intercom system as claimed in claim 1, wherein the second intercom station is provided as a wall or gate mounted control panel device.

6. The intercom system as claimed in claim 1, wherein the second intercom station comprises a call button that when pressed activates the camera means.

7. The intercom system as claimed in claim 1, wherein the first intercom station is selected from among a mobile phone, a tablet, a laptop or the like.

8. The intercom system as claimed in claim 1, wherein lighting means provided adjacent or beside the camera means of the second intercom station, wherein activating the camera means simultaneously activates the lighting means.

9. An intercom station comprising:
   one or more processor means, camera means and means for two-way voice communication, and
   storage means, including a static random-access memory (SRAM) and a synchronous dynamic random-access memory (SDRAM),
   wherein, when activated, the intercom station is operable to activate the camera means to take a picture of a user and to send the picture to a remote processor device in a multimedia message and automatically and substantially simultaneously attempt to connect via a voice call to the remote processor device,
   wherein if the voice call is accepted then two-way voice communication between the intercom station and remote processor device is enabled, and if the voice call is rejected then two-way voice communication between the intercom stations is not enabled, and,
   wherein the picture taken by the camera means is first saved to the SRAM and then to the SDRAM.

10. The intercom station as claimed in claim 9, wherein the intercom station is provided as a wall or gate mounted control panel device.

11. The intercom station as claimed in claim 9, wherein the intercom station comprises a call button that when pressed activates the camera means.

12. The intercom station as claimed in claim 9, further comprising an LCD screen with up and down scroll buttons to locate a desired home or premises.

13. The intercom station as claimed in claim 9, further comprising lighting means provided adjacent or beside the camera means, wherein activating the camera means simultaneously activates the lighting means, and the lighting means is provided by one or more LEDs.

* * * * *